United States Patent [19]

Hartmann et al.

[11] Patent Number: 5,739,190
[45] Date of Patent: Apr. 14, 1998

[54] PROCESS FOR THE PREPARATION OF STABLE WATER-IN-OIL EMULSIONS OF HYDROLYZED POLYMERS OF N-VINYL AMIDES AND THE USE THEREOF

[75] Inventors: Heinrich Hartmann, Limburgerhof; Karl-Heinrich Schneider, Kleinkarlbach; Walter Denzinger, Speyer; Claudia Nilz, Rödersheim-Gronau; Dietmar Mönch, Weinheim, all of Germany

[73] Assignee: BASF Aktiengesellschaft, Ludwigshafen, Germany

[21] Appl. No.: 737,589

[22] PCT Filed: May 13, 1995

[86] PCT No.: PCT/EP95/01818

§ 371 Date: Nov. 21, 1996

§ 102(e) Date: Nov. 21, 1996

[87] PCT Pub. No.: WO95/32227

PCT Pub. Date: Nov. 30, 1995

[30] Foreign Application Priority Data

May 25, 1994 [DE] Germany ............ 44 18 156.6

[51] Int. Cl.$^6$ .................................... C08K 5/10
[52] U.S. Cl. ................ 524/310; 162/72; 162/76; 210/735; 524/5; 524/11; 524/306; 524/311; 524/504; 524/505; 524/801; 524/813
[58] Field of Search ...................... 524/457, 504, 524/801, 813, 5, 505, 111, 306, 310, 311; 162/72, 76; 210/735

[56] References Cited

U.S. PATENT DOCUMENTS

| | | | |
|---|---|---|---|
| 4,327,005 | 4/1982 | Ramlow et al. | 525/11 X |
| 4,421,602 | 12/1983 | Brunnmueller et al. | |
| 4,623,699 | 11/1986 | Brunnmueller et al. | |
| 4,879,361 | 11/1989 | Rehmer et al. | 526/201 |
| 5,280,077 | 1/1994 | Carroll et al. | 526/303.1 X |
| 5,290,869 | 3/1994 | Kinoshita et al. | 525/296 X |
| 5,334,287 | 8/1994 | Hartmann et al. | 525/54.3 X |
| 5,373,076 | 12/1994 | Pinschmide, Jr. | 526/303.1 |
| 5,578,678 | 11/1996 | Hartmann et al. | 525/54.3 |

FOREIGN PATENT DOCUMENTS

| | | |
|---|---|---|
| 0 231 901 B1 | 1/1987 | European Pat. Off. . |
| 0 262 577 | 4/1988 | European Pat. Off. . |
| 0 216 387 B1 | 1/1993 | European Pat. Off. . |
| 0 374 646 B1 | 4/1994 | European Pat. Off. . |
| 1 562 417 | 3/1980 | Germany . |

*Primary Examiner*—Judy M. Reddick
*Attorney, Agent, or Firm*—Oblon, Spivak, McClelland, Maier & Neustadt, P.C.

[57] ABSTRACT

A process for the preparation of a stable water-in-oil emulsion of a hydrolyzed polymer of an N-vinyl amide of the formula $$R-CO-N-CH=CH_2, \quad (I)$$
$$\phantom{R-CO-N-}|\phantom{CH=CH_2,}$$
$$\phantom{R-CO-N-}R^1$$

in which R and $R^1$ denote H or $C_1$–$C_6$ alkyl,
by the polymerization of a compound of the formula I alone or in admixture with another ethylenically unsaturated monomer in the presence of a polymerization initiator and emulsifier in the form of a water-in-oil emulsion, to form a water-in-oil polymeric emulsion, followed by hydrolysis of the polymer in the form of the water-in-oil polymeric emulsion in the presence of an acid or base and from 1 to 30 wt %, based on the polymer, of an emulsifier, the emulsifier used being a mixture of (a) from 5 to 95 wt % of a block or graft copolymer of the structure (A-B)m, (A)-B or (B)-A, in which in each case (a) from 5 to 95 wt % of a block or graft copolymer of the structure (A-B)$_m$, (A)$_n$B or (B)$_n$A, in which in each case
A is a hydrophobic homopolymer or copolymer having a degree of polymerization of at least 3,
B is a hydrophilic homopolymer or copolymer having a degree of polymerization of at least 3,
m is equal to or greater than 1, and
n is equal to or greater than 2, and (b) from 5 to 95 wt % of another water-in-oil emulsifier having a molar mass below 1000 g/mol.

9 Claims, No Drawings

PROCESS FOR THE PREPARATION OF STABLE WATER-IN-OIL EMULSIONS OF HYDROLYZED POLYMERS OF N-VINYL AMIDES AND THE USE THEREOF

BACKGROUND OF THE INVENTION

1. Field of the Invention

The invention relates to a process for the preparation of stable water-in-oil emulsions of hydrolyzed polymers of N-vinylcarboxylic acid amides by the hydrolysis of the polymers in the form of water-in-oil polymeric emulsions in the presence of emulsifiers, to the water-in-oil polymeric emulsions thus obtained, and to their use as flocculating agents, retention agents, and dispersing agents.

2. Discussion of the Background

Partially hydrolyzed polymers of N-vinyl formamide are described, for example, in U.S. Pat. No. 4,421,602. The linear basic polymers described therein contain as characteristic components from 90 to 10 mol % of vinyl amine units and from 10 to 90 mol % of N-vinyl formamide units. They are prepared in the presence of acids or bases by the polymerization of N-vinyl formamide and hydrolysis of the polymers in a dissolved state. The polymerization of the N-vinyl formamide can be carried out in the manner of a water-in-oil polymerization, but it is not possible to prepare stable water-in-oil emulsions therefrom by hydrolysis of the saponified polymers.

U.S. Pat. No. 4,623,699 discloses a process for the preparation of pulverulent, linear, basic polymers containing vinyl amine and N-vinyl formamide units as polymerized material, in which pulverulent polymers of N-vinyl formamide are hydrolyzed in the presence of not more than 5 wt % of water, based on the polymer used, using a gaseous hydrohalic acid. The hydrolysis of the polymer is preferably carried out in the absence of water. The particle size of the N-vinyl formamide polymer is from 10 to 1000, preferably from 50 to 400 mm.

EP-A 0,216,387 reveals a process for the preparation of water-soluble copolymers containing vinyl amine units as polymerized material by copolymerization of (a) from 95 to 10 mol % of N-vinyl formamide with (b) from 5 to 90 mol % of an ethylenically unsaturated monomer selected from the group consisting of vinyl acetate, vinyl propionate, $C_1$–$C_4$ alkylvinyl ethers, N-vinyl pyrrolidone, esters, nitriles, and amides of acrylic acid and methacrylic acid followed by hydrolysis of the copolymer in which from 30 to 100 mol % of the formyl groups are eliminated from the copolymer. The preparation of the polymers can take place in a water-in-oil emulsion, but the hydrolysis is carried out in the form of a paste in aqueous suspension or aqueous solution.

EP-A 0,231,901 discloses the preparation of particularly high molecular weight polymers of N-vinyl formamide, in which a highly purified N-vinyl formamide is subjected to polymerization in the form of a water-in-oil emulsion.

EP-A 0,262,577 and EP-A 0,264,649 likewise describe the polymerization of N-vinyl formamide and substituted N-vinyl amides in the form of a water-in-oil emulsion; however the hydrolysis again takes place in aqueous solution, in each case.

Dilute aqueous solutions of high molecular weight polymers containing N-vinyl amine units as polymerized material have a very high viscosity. Thus 5% strength aqueous solutions are no longer capable of being pumped, for example. Water-in-oil polymeric emulsions may therefore be regarded as being suitable for the economical use of hydrolyzed polymers of N-vinyl amides, which still have a relatively low viscosity even at polymer contents of from 20 to 40 wt %, so that they are capable of being pumped.

GB-A 1,562,417 discloses a process for the preparation of non-settling water-in-oil dispersions of acrylamide polymers, in which the polymerization is carried out in the presence of emulsifiers which can be obtained by the reaction of glycidyl ethers of $C_{10}$–$C_{22}$ fatty alcohols with dihydric to hexahydric alcohols having from 2 to 6 carbon atoms or their monoethers derived from $C_{10}$–$C_{22}$ alcohols, in a molar ratio of glycidyl ether to alcohol ranging from 1:0.5 to 1:6. If desired, these emulsifiers can be caused to react with alkylene oxides having from 2 to 4 carbon atoms in a molar ratio 1:1 to 1:6.

EP-A 0,374,646 discloses a process for the preparation of stable water-in-oil emulsions of hydrolyzed polymers of N-vinyl amides, in which the emulsifiers used are the compounds described in GB-A 1,562,417 cited above. A drawback of these emulsifiers is that more highly concentrated water-in-oil emulsions having polymer contents of more than 25 wt % can be prepared only with difficulty and have relatively high viscosities.

SUMMARY OF THE INVENTION

It is the object of the present invention to provide a process for the preparation of stable water-in-oil emulsions of hydrolyzed polymers of N-vinyl amides, in which the water-in-oil polymeric emulsions of the partially or completely hydrolyzed N-vinyl amides have a lower viscosity than prior art water-in-oil polymeric emulsions having the same polymer content.

The object is achieved in the present invention with a process for the preparation of a stable water-in-oil emulsion of a hydrolyzed polymer of an N-vinyl amide of the formula

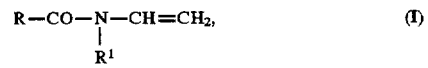

in which R and $R^1$ denote H or $C_1$–$C_6$ alkyl, by the polymerization of a compound of the formula I alone or in admixture with another ethylenically unsaturated monomer in the presence of a polymerization initiator and emulsifier in the form of a water-in-oil emulsion, to form a water-in-oil polymeric emulsion, followed by hydrolysis of the polymer in the form of the water-in-oil polymeric emulsion in the presence of an acid or base and from 1 to 30 wt %, based on the polymer, of an emulsifier, provided the emulsifier used is a mixture of (a) from 5 to 95 wt % of a block or graft copolymer of the structure $(A-B)_m$, $(A)_nB$ or $(B)_nA$, in which in each case A is a hydrophobic homopolymer or copolymer having a degree of polymerization of at least 3, B is a hydrophilic homopolymer or copolymer having a degree of polymerization of at least 3, m is equal to or greater than 1, and n is equal to or greater than 2, and (b) from 5 to 95 wt % of another water-in-oil emulsifier having a molar mass below 1000 g/mol.

In the emulsifier (a) the molar masses of A and B in the structures $(A-B)_m$, $(A)_n$-B and/or $(B)_n$-A are preferably each at least 500 g/mol.

The emulsifier mixtures preferably contain (a) amphiphilic block or graft copolymers of the general formula (A-COO)m-B, in which A is a hydrophobic polymer based on a poly(hydroxycarboxylic acid) and having a molar mass of >500 g/mol, B is a bifunctional, hydrophilic polymer based on a poly(alkylene oxide) and having a molar mass of >500 g/mol and xmx is at least 2 and (b) sorbitan monooleate, sorbitan monostearate, sorbitan dioleate, sorbitan trioleate, and/or sorbitan tristearate.

DETAILED DESCRIPTION OF THE PREFERRED EMBODIMENTS

The polymerization of the vinyl amides of the formula I preferably takes place when the above emulsifier mixtures are present. The water-in-oil polymeric emulsions thus obtained are easy to handle in use. The preparation of stable water-in-oil emulsions of hydrolyzed polymers of N-vinyl amides takes place in two process steps. In the first process step a water-in-oil emulsion of poly(N-vinyl-amide) s is prepared by polymerizing N-vinyl amides of the formula

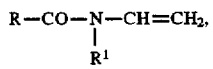  (I)

in which R and $R^1$ denote H or $C_1$–$C_6$ alkyl. Such N-vinyl amides are preferably used in which R and $R^1$ stand for H, ie N-vinyl formamide. Other suitable N-vinyl amides of the formula I are, for example, N-vinyl-N-methyl formamide, N-vinyl acetamide and N-vinyl-N-methyl acetamide.

The N-vinyl amides can be alternatively copolymerized together with other ethylenically unsaturated monomers which are copolymerizable therewith. Such comonomers are, for example, monoethylenically unsaturated $C_3$–$C_5$ carboxylic acids and their salts, esters, nitriles, and amides. Individual compounds of this nature are, for example, acrylic acid, methacrylic acid, maleic acid, fumaric acid, crotonic acid, itaconic acid, acrylamide, methacrylamide, acrylamidoglycolic acid, acrylonitrile, methacrylonitrile, methyl acrylate, methyl methacrylate, dimethylaminoethyl acrylate, dimethylaminoethyl methacrylate, diethylaminoethyl acrylate, diethylaminoethyl methacrylate, monomers containing sulfonic acid groups, eg, vinylsulfonic acid, allylsulfonic acid, methallylsulfonic acid, styrenesulfonic acid, 3-sulfopropyl acrylate, 3-sulfopropyl methacrylate, and acrylamidomethylpropanesulfonic acid and monomers containing phosphonate groups, such as vinyl phosphonate allyl phosphonate, methallyl phosphonate, and acrylamidomethylpropanephosphonic acid. In addition hydroxyalkyl esters of acrylic acid and methacrylic acid are suitable, for example, 2-hydroxyethyl acrylate, 2-hydroxypropyl acrylate, 3-hydroxypropyl acrylate and 2-hydroxyethyl methacrylate and hydroxypropyl methacrylate. This group of monomers also includes vinyl glycol, N-vinyl pyrrolidone, N-vinyl caprolactam, N-vinyl imidazole, N-vinylmethyl imidazole, N-vinyl-2-methyl imidazoline, N-vinyl-2-ethyl imidazoline, vinyl formate, vinyl acetate, vinyl propionate, vinyl butyrate, and mixtures of said monomers. Such ethylenically unsaturated monomers which contain carboxylic acid, sulfonic acid or phosphonic acid groups, are preferably used in partially or even completely neutralized form during the polymerization. To effect neutralization, alkali metal bases are preferably used, such as sodium hydroxide solution or potassium hydroxide solution or ammonia or amines, eg, trimethylamine, ethanolamine, or triethanolamine. Such basic monomers are preferably used in the form of their salts with mineral acids, eg, hydrochloric acid or sulfuric acid, or in quaternized form (suitable quaternizing agents being, for example, dimethyl sulfate, diethyl sulfate, methyl chloride, ethyl chloride or benzyl chloride). As a general rule applicable to the preparation of water-in-oil polymers, the monomers are first of all dissolved or emulsified in water. Those comonomers which dissolve less well in water, eg, acrylonitrile, methacrylonitrile, or butyl methacrylate, are therefore used during polymerization in not more than the amount corresponding to their solubility in water or to their solubility in the aqueous monomer solution.

Preferably, in the first stage of the process of the invention there are first of all prepared water-in-oil polymeric emulsions of homopolymers of N-vinyl formamide or copolymers of (1) from 99 to 1 mol % of N-vinyl formamide and
(2) from 1 to 99 mol % of an ethylenically unsaturated monomer selected from the group consisting of vinyl formate, vinyl acetate, vinyl propionate, N-vinyl pyrrolidone, N-vinyl caprolactam, N-vinyl imidazole, N-vinyl-2-methylimidazole, N-vinyl-2-ethylimidazole and the salts, esters, nitriles, and amides of acrylic acid and methacrylic acid, or mixtures thereof.

These polymers are then hydrolyzed in the second process stage.

During the copolymerization it is possible to use, if desired, a further group of monomers (3) which dissolve in water and have at least two ethylenically unsaturated bonds in the molecule. Such monomers are so-called cross-linkers and comprise, for example, methylene-bis-acrylamide, N,N-divinylethylene urea, N,N-divinylpropylene urea, ethylidene-bis-3-vinylpyrrolidone and acrylic acid, methacrylic acid and maleic acid esters of di- or polyhydric alcohols, eg, ethylene glycol diacrylate and ethylene glycol dimethacrylate. Other suitable esters of this nature are obtained, for example, by esterification of polyhydric alcohols, eg, glycerol, pentaerythritol, glucose, fructose, sucrose, poly(alkylene glycol)s having a molecular weight of from 400 to 2,000, polyglycerols having a molecular weight of from 126 to 368, with acrylic acid, methacrylic acid, or maleic acid, there being used, per mole of the alcohol employed, at least 2 mol of one of the said carboxylic acids or a mixture of said carboxylic acids. If water-soluble cross-linking agents are used during polymerization of the N-vinyl amides either alone or in admixture with other water-soluble monomers, the amount of cross-linking agents, based on the total monomeric mixture, is from 10 to 20,000 ppm, preferably from 100 to 10,000 ppm.

First of all, an aqueous monomer solution is prepared which has a pH of from 4 to 9, preferably from 5 to 8. In many cases it is recommendable to carry out the process additionally in the presence of buffers, eg, to add primary or secondary sodium phosphate to the aqueous phase. The concentration of the monomers in the aqueous solution is, for example, from 5 to 60 wt %, preferably from 10 to 50 wt %.

The aqueous monomer phase is emulsified in a hydrophobic organic dispersion medium. Suitable organic liquids which are virtually immiscible with water are straight-chain and branched-chain aliphatic hydrocarbons, such as pentane, hexane, octane, isooctane, decane, dodecane, paraffin oils, and liquid saturated hydrocarbon mixtures, the boiling points of which are in the range of from 120° to 350° C. under standard pressure (1,013 mbar). Apart from straight-chain and branched-chain aliphatic hydrocarbons, saturated cyclic hydrocarbons can also be used, such as cyclohexane, methylcyclohexane, dimethylcyclohexane, ethylcyclohexane, cyclopentane, cycloheptane, and cyclooctane. Likewise it is possible to use mixtures of said hydrocarbons such as are usually present in petroleum cuts. Such mixtures can also include aromatic hydrocarbons. It is equally possible to use, as hydrophobic organic dispersion medium, pure aromatic hydrocarbons such as toluene, xylenes, ethyl benzene, cumene, and benzene and chlorinated hydrocarbons, such as perchloroethylene, tetrachloroethylene, 1,1,1-trichloroethane, and Carbon tetrachloride. Preferably mixtures of saturated hydrocarbons containing up to 20 wt % of naphthenes are used. Such saturated hydrocarbons consist mainly of n- and i-paraffins. The boiling limit of such hydrocarbon mixtures is from 150° to 260° C. at 1.013 mbar (determined as specified in ASTM D 1078/86).

Furthermore, the oily phase (hydrophobic organic dispersion medium) can consist of vegetable and animal oils. These oils can be denaturized or refined products. The main components of the natural oils are mostly triglycerides, the carboxylic acid portion of which is derived from one or more ethylenically unsaturated or saturated $C_{10}$–$C_{30}$ fatty acids. Suitable vegetable oils are, for example, olive oil, safflower oil, soy oil, peanut oil, cottonseed oil, rape seed oil, sunflower oil, coffee bean oil, linseed oil, and mixtures thereof. Suitable animal oils are fish oils, eg. sardine oil, herring oil, salmon oil, shark liver oil, and whale oil. In addition to the fish oils, other suitable oils for the oily phase are tallow oil, bone oil, and lard oil. The oily phase of the water-in-oil polymeric emulsions can be made up of a single pure oil or of any desired mixture of such oils. Preferred oils are sunflower oil, rape seed oil, soy oil, and tallow oil.

The oily phase can also consist of aliphatic dicarboxylic acid esters. Preferred types are those of adipic acid and sebacic acid, eg. bis-(2-ethylhexyl) sebacate, bis-(2-ethylhexyl) adipate, didodecyl succinate, and dipropyl adipate, cf DE-B 3,524,950.

A further class of substances suitable for use as the oily phase are aliphatic ethers, particularly monoethers, such as di-n-octyl ether, n-octyl-n-nonyl ether, di-n-decyl ether, and di-n-nonyl ether, cf DE-A 4,111,334.

The amount of the oily phase (hydrophobic organic dispersion medium) contained in the water-in-oil polymeric emulsion is in most cases, for example, from 10 to 70 wt % and preferably from 20 to 50 wt %.

The polymerization of the monomers takes place in the presence of initiators which can form radicals under the polymerization conditions, eg. in the presence of peroxides, hydroperoxides, hydrogen peroxide, azo compounds, or so-called redox catalysts. Suitable radical-forming initiators are all of said compounds which have a half life of less as 3 h at the polymerization temperature used. If the polymerization is started at a low temperature and is brought to a close at a higher temperature, it is advantageous to use at least 2 initiators which decompose at different temperatures, that is to say, to use first of all an initiator which decomposes without much heating, to initiate the polymerization, and then to complete the main polymerization with an initiator which decomposes at a higher temperature. Water-soluble and water-insoluble initiators or mixtures of water-soluble and water-insoluble initiators can be used. Such water-insoluble initiators are then soluble in the organic phase.

Suitable initiators are, for example, acetylcyclohexanesulfonyl peroxide, diacetylperoxy dicarbonate, dicyclohexylperoxy dicarbonate, di-2-ethylhexylperoxy dicarbonate, tert-butyl perneodecanoate, 2,2'-azobis-(4-methoxy-2,4-dimethylvaleronitrile), 2,2'-azobis(2-methyl-N-phenylpropionamidine) dihydrochloride, 2,2'-azobis(2-methylpropionamidine) dihydrochloride, tert-butyl perpivalate, dioctanoyl peroxide, dilauroyl peroxide, 2,2'-azobis(2,4-dimethylvaleronitrile), dibenzoyl peroxide, tert-butylper-2-ethyl hexanoate, tert-butyl permaleate, 2,2'-azobis-(isobutyronitrile), dimethyl-2,2'-azobisisobutyrate, bis-(tert-butylperoxy) cyclohexane, tert-butylperoxy isopropylcarbonate, tertbutyl peracetate, 2,2'-bis-(tert-butylperoxy) butane, dicumyl peroxide, di-tert-amyl peroxide, di-tert-butyl peroxide, p-menthane hydroperoxide, pentane hydroperoxide, cumene hydroperoxide and tert-butyl hydroperoxide.

If, in addition, salts of heavy metals, eg. copper, cobalt, manganese, iron, nickel, vanadium, and chromium salts or organic compounds such as benzoin, dimethylaniline, or ascorbic acid are used together with at least one of the initiators stated above, the half lives of the said radical-forming initiators can be decreased. Thus, for example, tert-butyl hydroperoxide can be activated by the addition of only 5 ppm of copper(1) acetylacetonate such that the monomers can be polymerized at as low a temperature as 100° C. The reducing component of redox catalysts can also be formed, for example, by compounds such as sodium sullite, sodium bisulfite, sodium formaldehyde sulfoxylate, and hydrazine.

Based on the monomers used in the polymerization usually, eg. from 100 to 10,000 ppm, preferably from 100 to 5,000 ppm, of a polymerization initiator or a mixture of a number of polymerization initiators are used.

If required, the polymerization can be carried out in the presence of modifiers. Suitable modifiers are, for example, mercapto compounds such as mercaptoethanol, mercaptopropanol, mercaptobutanol, mercaptoacetic acid, mercaptopropionic acid, butyl mercaptan, and dodecyl mercaptan, and also allyl compounds such as allyl alcohol, aldehydes such as acetaldehyde, propionaldehyde, n-butyraldehyde, and iso-butyraldehyde and formic acid and isopropanol. If the polymerization is carried out in the presence of modifiers, they should be used in an amount of from 0.05 to 5 wt %, based on the monomers used in the polymerization. Sometimes it is advantageous to use monomers listed in group (3) above together with modifiers.

Such oil-soluble polymeric water-in-oil emulsifiers (component (a) of the emulsifier mixture) are for example, diblock and triblock copolymers based on polystyrene and poly(ethylene oxide), as described in ACS Polym. Prepr. Vol 18, 329 (1977) and in DE-B 2,301,224 and DE-A 4,134,967. Also suitable are diblock and triblock copolymers based on alkyl methacrylates and poly(ethylene oxide) as described in Polym. Jr., 8, 190 (1976), and diblock and triblock copolymers based on polyisobutene and poly(ethylene oxide) as described in Polym. Vol 13, 115 (1985), as well as graft copolymers based on polystyrene and poly(vinyl pyrrolidone) as revealed in Angew. Macromol. Chemie, 132, 81(1985). Furthermore polymeric emulsifiers are suitable such as are described in EP-B 0,214,758 and U.S. Pat. No. 4,339,371.

Preferred oil-soluble water-in-oil emulsifiers in component (a) are described in EP-A 0,000,424. Particularly suitable emulsifiers in component (a) are block copolymers of the ABA type, the block A of which consists of condensed 12-hydroxystearic acid and the block B of which comprises poly(ethylene oxide) having a molar mass of more than 500 g per mole. The molar mass of the block A is likewise more than 500 g/mol. Block copolymers of this nature can be obtained commercially unter the names of Hypermer B246 and Hypermer B261. They have HLB values in the range of from 5 to 9. The emulsifier mixtures preferably contain from 10 to 70 wt % of these block copolymers.

Other water-in-oil emulsifiers having a molar mass of less than 1,000 g per mole are suitable as component (b) of the emulsifier mixtures. Suitable water-in-oil emulsifiers in component (b) having HLB values of from 2 to 10, preferably from 3 to 7, are, for example, mono-, di- and poly-glycerol fatty acid esters, such as the monooleate, dioleate, monostearate, distearate, and palmitate-stearate. These esters can be obtained, for example, by esterifying mono-, di- and poly-glycerols or mixtures of the said polyhydric alcohols with long-chain fatty acids, eg, with oleic acid, stearic acid, or palmitic acid. Other suitable water-in-oil emulsifiers are sorbitan fatty acid esters, such as, in particular, sorbitan monooleate, sorbitan dioleate, sorbitan trioleate, sorbitan monostearate, and sorbitan tristearate. Other suitable water-in-oil emulsifiers are mannitol fatty acid esters, such as mannitol monolaurate or mannitol monopalmitate, pentaerythritol fatty acid esters, such as pentaerythritol monomyristate, pentaerythritol monopalmitate, and pentaerythritol dipalmitate, poly(ethylene glycol) sorbitan fatty acid esters, particularly the monooleates, poly(ethylene glycol) mannitol fatty acid esters, in particular monooleates and trioleates, glucose fatty acid esters, such as glucose monooleate and glucose monostearate, trimethylolpropane distearate, reaction products of isopropylamide with oleic acid, glycerol sorbitan fatty acid esters, ethoxylated alkylamines, hexadecylsodiumphthalate, and decylsodium phthalate. The water-in-oil emulsifiers described in GB-A 1,562,417 can also be used as (b) in the emulsifier mixture. Sorbitan monooleate, sorbitan monostearate, sorbitan dioleate, sorbitan trioleate, sorbitan tristearate, or mixtures thereof are preferably used as component (b), whilst sorbitan monooleate yields the best results. The emulsifier mixture is present in the water-in-oil polymeric emulsion of the invention in an amount of from 1 to 30 wt % and preferably from 1 to 20 wt % (based on monomer). The emulsifiers of the group (b) are preferably present in the emulsifier mixture to an extent of from 90 to 30 wt %.

Furthermore, the water-in-oil polymeric emulsions can contain, if desired, up to 10 wt %, based on the total emulsion, of a wetting agent having an HLB value of more than 10 (for the definition of the HLB value cf W. C. Griffin, journal of the Society of Cosmetic Chemists, Vol. 1, 311 (1950). Suitable wetting agents having an ELB value above 10 are, for example, ethoxylated alkylphenols, dialkyl esters of sodium sulfosuccinates in which the alkyl group has at least 3 carbon atoms, soaps derived from fatty acids having from 10 to 22 carbon atoms, and alkali metal salts of alkyl or alkylene sulfates having from 10 to 26 carbon atoms. In addition, ethoxylated fatty alcohols and ethoxylated amines are suitable. If the wetting agents are used in the polymerization stage, particularly finely divided water-in-oil polymeric emulsions are obtained.

For the preparation of the water-in-oil polymeric emulsions of N-vinyl amides there are used from 1 to 30 wt %, based on the monomers, of water-in-oil emulsifiers described above. The polymerization of the water-in-oil monomer emulsion takes place at temperatures of from 5° to 150° C. The polymerization is preferably carried out under standard pressure but can be carried out under reduced or elevated pressure to control the temperature. During the polymerization, provision is made for good intermixing of the reactants. On a commercial scale, stirred boilers equipped with an anchor screw may be regarded as being suitable for this purpose. The rotational velocity of the stirrer is approximately from 100 to 400 revolutions per minute. Polymerization is preferably controlled in such a manner that the monomers polymerize virtually completely. If required, a postpolymerization stage may follow on the main polymerization, in which case further amounts of peroxide or azo compounds are added to the reaction mixture, for example.

Sometimes it is advantageous to place a portion of the emulsifier mixture or only a portion of the emulsifiers (a) and/or (b) in the reactor and to add the remainder continuously or portionwise during the polymerization. Alternatively, the polymerization can be carried out as follows: the water-in-oil emulsion of the monomers is prepared, a portion thereof is admixed with approximately from 10 to 20% of initiator in the polymerization reactor, and the mixture is heated to the desired polymerization temperature. Once the reaction has started, the remaining water-in-oil emulsion of the monomer and the remaining initiator are then metered in over a period of approximately 1 to 10 h, to achieve better heat dissipation. If the entire polymerization batch is placed in the reactor at once, the resulting heat of polymerization is advantageously removed by brine cooling. Another possibility for the removal of the heat of polymerization is evaporative cooling. In this procedure the evaporated water or the azeotropic mixture is condensed and either recycled to the polymerization batch or, advantageously, removed from the system, by which means concentration of the water-in-oil emulsion is achieved.

In this way, water-in-oil polymeric emulsions having a polymer content of from 10 to 50 wt % are obtained. If water-in-oil polymeric emulsions having an even high polymer content are desired, the polymer content can be increased by the simple removal, by distillation, of water and, if necessary, by azeotropic removal of water and hydrocarbon oil. Thus water-in-oil polymeric emulsions can be obtained which have a polymer content of up to 70 wt %. Particularly stable water-in-oil polymeric emulsions are obtained when the emulsifier mixture described above and consisting of the components (a) and (b) is used when preparing the not yet hydrolyzed water-in-oil polymeric emulsion.

Polymers of N-vinyl amides of the formula I and the copolymers have K-values of from 20 to 300, preferably from 50 to 280. For most applications K-values of the polymers of from 100 to 250 are of particular interest.

In the second process stage of the process of the invention the hydrolysis of the polymers prepared in the first stage takes place. The polymers contain at least 1 mol % of units of the formula

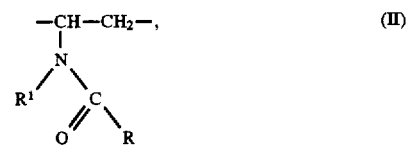

(II)

in which R and $R^1$ denote H, $C_2$–$C_6$ alkyl, and which are converted by hydrolysis into units of the formula

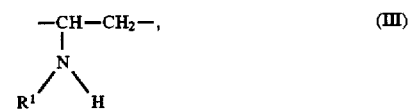

(III)

in which $R^1$ is H or $C_1$–$C_6$ alkyl. Depending on the reaction conditions used during the hydrolysis, ie on the amount of acid or base, based on the polymer to be hydrolyzed, and the temperature of reaction during the hydrolysis, either partial or complete hydrolysis of the units of the formula (II) is achieved. The hydrolysis of the polymers is carried to a point such that, eg, from 1 to 100% of the monomer units of the formula II present in the polymers, preferably from 10 to 90% of these units, is hydrolyzed. In order to carry out the hydrolysis, it is essential that the water-in-oil polymeric emulsions which are prepared in the first process stage contain the emulsifier mixtures described above.

These emulsifier mixtures are present to an extent of from 1 to 30 wt % and preferably from 1 to 20 wt %, based on the polymers in the water-in-oil polymeric emulsion, when the hydrolysis of the monomer units contained in the polymers (II) is carried out. In the preferred embodiment of the process of the invention, these emulsifiers are used when preparing the water-in-oil polymeric emulsions. However, it is also possible to add the emulsifier (a) to such water-in-oil emulsions of N-vinyl amides of the formula 1 which have been prepared in the presence of other, conventional water-in-oil emulsifiers differing from the emulsifiers (a). The hydrolysis takes place under reaction conditions under which water-in-oil polymeric emulsions are usually unstable. That is to say, there is added, to effect hydrolysis, an acid or base to the water-in-oil polymeric emulsion prepared in the first process stage and containing the emulsifier mixture, or to the concentrated water-in-oil polymeric emulsions likewise containing this emulsifier mixture. Acids suitable for the hydrolysis are, for example, mineral acids such as hydrogen halide (in gaseous form or in aqueous solution), sulfuric acid, nitric acid, and phosphoric acid (ortho- and meta-polyphosphoric acids) and organic acids, eg, $C_1$–$C_5$ carboxylic acids, such as formic acid, acetic acid, and propionic acid or the aliphatic or aromatic sulfonic acids, such as methanesulfonic acid, benzenesulfonic acid, or toluenesulfonic acid. Preferably, to effect hydrolysis, hydrochloric acid or sulfuric acid is used. When hydrolysis is effected with acids, the pH is from 0 to 5. From 0.05 to 1.5, preferably from 0.4 to 1.2, equivalents of acid, are required per formyl group equivalent in the polymer.

When the hydrolysis is effected by the use of bases, metal hydroxides of metals of the first and second main groups of the Periodic Table can be used. For example, lithium hydroxide, sodiumhydroxide, potassium hydroxide, calcium hydroxide, strontium hydroxide, and barium hydroxide are suitable. Likewise ammonia and alkyl derivates of ammonia can be used, as can, eg, alkyl or aryl amines, eg, triethylamine, monoethanolamine, diethanolamine, triethanolamine, morpholine, or aniline. In the case of hydrolysis carried out using bases, the pH is from 8 to 14. The bases can be used, diluted or undiluted, in the solid, liquid or, if required, gaseous state. Preferably the bases used for the hydrolysis are ammonia, sodium hydroxide solution, or potassium hydroxide solution. Hydrolysis carried out in the acid or alkaline range of pHs takes place at temperatures of from 30° to 170° C., preferably from 50° to 120° C. It is terminated after approximately from 2 to 8 h, preferably from 3 to 5 h. After these reaction times, degrees of hydrolysis of the units of the formula II in the polymer are achieved which are from 1 to 100%, preferably from 10 to 90%. Particularly good results have been attained using a mode of operation in which the bases or acids are added in aqueous solution to the hydrolysis mixture and in which the concentration of polymer in the water-in-oil polymeric emulsion is kept in the range of from 20 to 50% by azeotropic distillation during hydrolysis. The hydrolyzed water-in-oil polymeric emulsion can be concentrated, if desired, on completion of the hydrolysis, eg, to polymer contents of from 25 to 70 wt %, based on the total emulsion. Following hydrolysis, neutralization is generally carried out such that the pH of the hydrolyzed water-in-oil polymeric emulsion is from 2 to 8 and is preferably in the range of from 3 to 7. Neutralization is necessary when it is desired to avoid any continuance of the hydrolysis of partially hydrolyzed polymers. To neutralize acid hydrolysates, metal hydroxides, particularly sodium hydroxide solution or potassium hydroxide solution, ammonia or amines are suitable. Basic hydrolysates are neutralized with mineral acids, preferably hydrogen halide (in gaseous form or in aqueous solution) or organic acids, eg, $C_1$–$C_5$ carboxylic acids. The carboxylic acids forming during hydrolysis can be esterified, eg, with a $C_2$–$C_4$ alcohol and the esters then removed, by azeotropic distillation, from the water-in-oil polymeric emulsion. There are thus obtained, in said subsequent neutralization, salt-impoverished water-in-oil polymeric emulsions. The viscosity of the hydrolyzed water-in-oil polymers is, at 20° C., from 20 to 10,000 mPa·s and preferably from 50 to 5,000 mPa·s. These water-in-oil polymeric emulsions can thus be handled in a simple manner. For example, it is possible to convey them by pumping.

When using the water-in-oil emulsions of hydrolyzed polymers, it is desirable that these products invert rapidly when poured into water. As known for emulsions of this type from U.S. Pat. No. 3,624,019, they can be set to invert by adding from 0.5 to 10%, preferably from 1 to 5%, of a wetting agent having an HLB value of at least 9. Suitable surfactants of this kind are, for example, the products obtained by adding from 8 to 30 mol of ethylene oxide to $C_8$–$C_{12}$ alkylphenols or the products obtained by adding from 5 to 30 mol of ethylene oxide to $C_{12}$–$C_{18}$ alcohols or $C_{10}$–$C_{12}$ alkyl sulfonates. Further suitable wetting agents are the products obtained by adding alkylene oxide mixtures or blocks to $C_9$–$C_{18}$ alcohols. Constituents of said mixtures or blocks are from 1 to 30 mol of ethylene oxide, up to 30 mol of propylene oxide, and up to 30 mol of butylene oxide, based on the alcohol or the alcohol mixtures. If water-in-oil polymeric emulsions containing wetting agent are poured into water, phase reversal takes place and the polymer present in the emulsions rapidly dissolves in the water.

The water-in-oil emulsions prepared in the present invention and containing hydrolyzed N-vinylformmnide polymers are used, for example, as retention and flocculating agents in the manufacture of paper and for the clarification of waste water and sludges, eg, in sewers, as dispersing agents and protective colloids for drill mud, as auxiliaries in secondary and tertiary production of petroleum in flowing water, as anticorrosive agents, and as cement additives. Such weakly cross-linked polymers are suitable as thickening agents, for example, for use in textile printing pastes or for use in cleaner formulations. In all cases very dilute aqueous solutions are required, which are user-prepared by the inversion of the water-in-oil polymeric emulsions of hydrolyzed N-vinyl amide polymers containing wetting agent. The water-in-oil polymeric emulsions of the invention are non-settling.

The K-values were determined as proposed by H. Fikentscher in Cellulose-Chemie, Vol. 13, 58–64 and 71–74 (1932); where $K=k\cdot10^3$. The K-values of the copolymers were determined at a polymer concentration of 0.1 wt % in an aqueous salt solution, which was prepared by dissolving 5 g of common salt and 0.08 g of the product obtained by adding 10 mol of ethylene oxide to 1 mol of isononylphenol in 94.92 g of distilled water. The measurements were carried out at 25° C.

The viscosity of the water-in-oil emulsions was measured with a Brookfield viscosimeter at 20 rpm and 23° C.

In the following examples the percentages are by weight unless otherwise stated.

Emulsifier 1 (component (a) in the emulsifier mixture)

Polyester-block-poly(ethylene oxide)-block-polyester having a molar mass greater than 1,000 g/mol, which is prepared by the reaction of condensed 12-hydroxystearic acid with poly(ethylene oxide) according to the teaching of EP-A 0,000,424 and traded unter the name of Hypermer B246.

Emulsifier 2

Sorbitan monooleate, which is marketed by ICI unter the name of Span 80.

Emulsifier 3

Reaction product of (A) oleyl alcohol with epichlorohydrin in a molar ratio of 1:1 to produce oleylglycidyl ether, (B) reaction of the oleylglycidyl ether with glycerol in a molar ratio of 1:1 in the presence of $BF_3$-phosphoric acid at a temperature of 80° C. and removal of the catalyst with the aid of a basic ion exchanger, and (C) ethoxylation of the reaction product obtained under (B) with 2 mol of ethylene oxide. Said preparation takes place according to the teaching of GB-A 1,562,417.

EXAMPLE 1

The following substances are placed in a polymerization reactor having a capacity of 2 L and provided with an anchor screw, a reflux condenser, a thermometer, and a nitrogen inlet, with stirring: 290 g of a hydrocarbon mixture boiling in the range of from 192° to 254° C., 8 g of emulsifier 1 and 32 g of emulsifier 2. A solution is added thereto which comprises 4.9 g of 75% strength phosphoric acid, 3.3 g of 50% strength sodium hydroxide solution and 250 g of freshly distilled N-vinyl formamide in 401 g of water and which has a pH of 6.3. The contents of the vessel are emulsified for 1 h at a stirring velocity of 400 rpm under a stream of 10 L/h of nitrogen. 0.25 g of 2,2'-azobis(4-methoxy-2,4-dimethylvaleronitrile) and 0.125 g of 2,2'-azobis(2,4-dimethylvaleronitrile) suspended in 10 g of hydrocarbon mixture are then added, and polymerization is carried out at 30° C. over a period of 8 h with stirring at 400 rpm under a stream of 10 L/h of nitrogen. Polymerization is then carried to completion for a further 4 h at 55° C. The thin emulsion free from specks and coagulated material has a viscosity of 80 mPa·s. The K-value of the polymer is 212. The batch is cooled to 50° C. and, to effect hydrolysis of the poly(vinyl formamide), 45.1 g of hydrogen chloride (in gaseous form) are introduced over a period of 0.5 h. The hydrolysis is stopped after a period of 5 h at 50° C. By this time, 30% of the formamide groups of the poly(N-vinyl formamide) has become converted to amine groups. The reaction mixture is now cooled to 20° C. and adjusted to pH 5 by the introduction of gaseous ammonia. 30 g of the product obtained by adding 10 mol of ethylene oxide to 1 mol of isononylphenol are then added over a period of 0.5 h with stirring and the mixture is stirred for a further 2 h. The water-in-oil emulsion obtained is smooth and free from specks and coagulate. The viscosity of the emulsion is 90 mPa·s. The emulsion inverts when poured into water, during which process the polymer rapidly dissolves in water.

EXAMPLE 2

Example 1 is repeated except that the emulsifier mixture used comprises 7 g of emulsifier 1 and 28 g of emulsifier 2. Prior to the hydrolysis, the viscosity of the speck-free and coagulate-free dispersion is 80 mPa·s and the K-value of the polymer is 230. Following hydrolysis and the addition of the surfactant, the viscosity is 120 mPa·s.

EXAMPLE 3

Example 1 is repeated except that the emulsifier mixture used comprises 4 g of emulsifier 1 and 36 g of emulsifier 2. Prior to the hydrolysis, the viscosity of the speck-free and coagulate-free dispersion is 70 mPa·s and the K-value of the polymer is 202. Following hydrolysis and the addition of the surfactant, the viscosity is 86 mPa·s.

EXAMPLE 4

230 g of a hydrocarbon mixture boiling in the range of from 192° to 254° C., 9 g of emulsifier 1 and 27 g of emulsifier 2 are placed in a reactor as used in Example 1, with stirring. A solution is added thereto which consists of 5.88 g of 75% strength phosphoric acid, 3.96 g of 50% strength sodium hydroxide solution, and 300 g of freshly distilled N-vinyl formamide in 399 g of water and having a pH of 6.3. The contents of the vessel are emulsified over a period of 1 h at a stirring velocity of 400 rpm while passing in 10 L/h of nitrogen. 0.3 g of 2,2'-azobis(4-methoxy-2,4-dimethylvaleronitrile) and 0.15 g of 2,2'-azobis(2,4-dimethylvaleronnitrile) suspended in 10 g of hydrocarbon, are then added and polymerization is carried out at 30° C. over a period of 8 h with stirring at 400 rpm under a stream of 10 L/h of nitrogen. Polymerization is then carried to completion over a further 4 h at 40° C. The viscosity of the water-in-oil emulsion is 260 mPa·s and the K-value of the polymer is 227. The batch is then heated to 50° C. and, to effect hydrolysis of the poly(vinyl formamide), 74 g of hydrogen chloride (in gaseous form) are introduced over a period of 1 h. Hydrolysis is stopped after a period of 5 h at 50° C. By this time, 40% of the formamide groups of the poly(N-vinyl formamide) has become converted to amine groups. The reaction mixture is then cooled to 20° C. and adjusted to a pH of 5 by the introduction of gaseous ammonia. 30 g of the product obtained by adding 10 mol of ethylene oxide to 1 mol of isononylphenol are added over a period of 0.5 h and stirring is continued for a further 2 h. The water-in-oil emulsion obtained is then smooth and free from specks and coagulated material. The viscosity of the emulsion is 210 mPa·s. The emulsion inverts when poured into water, during which process the polymer readily dissolves in water.

EXAMPLE 5

307 g of a hydrocarbon mixture boiling in the range of from 192° to 254° C., 18 g of emulsifier 2, and 6 g of emulsifier 1 are placed in a reactor as used in Example 1, with stirring. A solution is added thereto which consists of 5.88 g of 75% strength phosphoric acid, 3.96 g of 50% strength sodium hydroxide solution, and 300 g of freshly distilled N-vinyl formamide in 199 g of water and having a pH of 6.5. The contents of the vessel are emulsified over a period of 1 h at a stirring velocity of 400 rpm while passing in 10 L/h of nitrogen. 0.3 g of 2,2'-azobis(4-methoxy-2,4-dimethylvaleronitrile) and 0.15 g of 2,2'-azobis(2,4-dimethylvaleronnitrile), suspended in 10 g of hydrocarbon, are then added, and polymerization is carried out at 30° C. over a period of 8 h with stirring at 400 rpm under a stream of 10 L/h of nitrogen. After a period of 2 h, 0.05 g of emulsifier 1 is added, and after a further 2 h, 2.25 g of emulsifier 2 are added to the reaction mixture, the temperature being kept at 30° C. Polymerization is effected over a period of 8 hours at 30° C., after which the mixture is heated to 40° C. and polymerization is then carried to completion over a further 4 h. The viscosity of the water-in-oil emulsion is 30 mPa·s and the K-value of the polymer is 230. The batch is then heated to 50° C. and, to effect hydrolysis of the poly(vinyl formamide), 25 g of hydrogen chloride (in gaseous form) are then introduced over a period of 0.5 h.

Hydrolysis is stopped after a period of 5 h at 50° C. By this time, 11% of the formamide groups has become converted to amine groups. The reaction mixture is then adjusted to pH 5 by the addition of 50% strength sodium hydroxide solution. 30 g of the product obtained by adding 10 mol of ethylene oxide to 1 mol of isononylphenol are added over a period of 0.5 h, and stirring is continued for a further 2 h. The water-in-oil emulsion obtained is thin and free from specks and coagulated material and has a viscosity of 50 mPa·s. The emulsion inverts when poured into water, during which process the polymer readily dissolves in water.

EXAMPLE 6

200 g of rape seed oil, 20 g of emulsifier 1, and 20 g of emulsifier 2 are placed in a reactor as used in Example 1. To this mixture there is added a solution of 100 g of freshly distilled N-vinyl formamide in 200 g of water, and the mixture is stirred at 200 rpm over a period of 0.5 h under a stream of 15 L/h of nitrogen at a temperature of 25° C. 0.4 g of 2,2-azobis(2,4-dimethylvaleronitrile) dissolved in 1 g of acetone is then added, and the reaction mixture is heated to 55° C. The heat of reaction is removed by cooling with brine and the internal temperature is kept at a constant value of 55° C. When the reaction is complete, polymerization is carried to completion for a further 2 h at 55° C. The coagulate-free emulsion has a viscosity of 1,400 mPa·s and the K-value of the polymer is 194. The mixture is then cooled to 50° C. and 8 g of hydrogen chloride (in gaseous form) are metered in over a period of 30 min. The hydrolysis is stopped after a period of 5 h, by which time 13% of the formamide groups in the poly(N-vinyl formamide) has been converted to amine groups. The reaction mixture is adjusted to pH 5 by the introduction of ammonia gas. 6.8 mol of ethylene oxide and 18 g of the product obtained by adding 3.2 mol of propylene oxide to 1 mol of $C_{13}-C_{15}$ oxoalcohol are then added over a period of 0.5 h with stirring, and are stirred in over a further 2 h. Following cooling, a coagulate-free emulsion is obtained which has a viscosity of 1,200 mPa·s. The emulsion inverts when poured into water, during which process the polymer readily dissolves in water.

EXAMPLE 7

Example 6 is repeated except that the emulsifier used comprises 10 g of emulsifier 1 and 5 g of emulsifier 3. Following polymerization but prior to hydrolysis, the coagulate-free dispersion has a viscosity of 950 mPa·s. The K-value of the polymer is 194. Following hydrolysis 18 g of a reaction product of 1 mol of $C_{13}-C_{15}$ oxoalcohol with 2 mol of ethylene oxide and 4 mol of propylene oxide are added. Following cooling, a coagulate-free emulsion is obtained which has a viscosity of 850 mPa·s and which inverts when poured into water.

We claim:

1. A process for the preparation of a stable water-in-oil emulsion of a hydrolyzed polymer of an N-vinyl amide of the formula

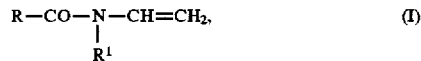

(I)

in which R and $R^1$ denote H or $C_1-C_6$ alkyl, by the polymerization of a compound of the formula I alone or in admixture with another ethylenically unsaturated monomer in the presence of a polymerization initiator and emulsifier in the form of a water-in-oil emulsion, to form a water-in-oil polymeric emulsion, followed by hydrolysis of the polymer in the form of the water-in-oil polymeric emulsion in the presence of an acid or base and from 1 to 30 wt %, based on the polymer, of an emulsifier, provided the emulsifier used is a mixture of, by total weight of emulsifier, (a) from 5 to 95 wt % of a block or graft copolymer of the structure $(A-B)_m$, $(A)_nB$ or $(B)_nA$, in which in each case A is a hydrophobic homopolymer or copolymer having a degree of polymerization of at least 3, B is a hydrophilic homopolymer or copolymer having a degree of polymerization of at least 3, m is equal to or greater than 1, and n is equal to or greater than 2, and (b) from 5 to 95 wt % of another water-in-oil emulsifier having a molar mass below 1000 g/mol.

2. A process as defined in claim 1, wherein, in the emulsifier (a), the molar masses of A and B in the structures $(A-B)_m$, $(A)_nB$ and/or $(B)nA$ are each at least 500 g/mol.

3. A process as defined in claim 1, wherein the emulsifier mixture contains (a) an amphiphilic block or graft copolymer of the formula (A-COO)m-B, in which A is a hydrophobic polymer based on a poly(hydroxycarboxylic acid) and having a molar mass of >500 g/mol, B is a bifunctional hydrophilic polymer based on a poly(alkylene oxide) and having a molar mass of >500 g/mol and m is at least 2 and (b) another water-in-oil emulsifier having a molar mass below 1000 g/mol.

4. A process as defined in any of claim 1, wherein the emulsifier mixture contains (a) an amphiphilic block or graft copolymer of the formula (A-COO)m-B, in which A is a hydrophobic polymer based on a poly(hydroxycarboxylic acid) and having a molar mass of >500 g/mol, B is a bifunctional hydrophilic polymer based on a poly(alkylene oxide) and having a molar mass of >500 g/mol and m is at least 2 and (b) sorbitan monooleate, sorbitan monostearate, sorbitan dioleate, sorbitan trioleate, and/or sorbitan tristearate.

5. A process as defined in any of claim 1, wherein the compound of the formula I used is N-vinyl formamide.

6. A process as defined in claim 1, wherein copolymers are hydrolyzed which are derived from (1) from 99 to 1 mol % of N-vinyl formamide and (2) from 1 to 99 mol % of an ethylenically unsaturated monomer selected from the group consisting of vinyl formate, vinyl acetate, vinyl propionate, N-vinyl pyrrolidone, N-vinyl caprolactam, N-vinyl imidazole, N-vinyl-2-methyl imidazole, N-vinyl-2-ethyl imidazole, and the salts, esters, nitriles, and amides of acrylic acid and methacrylic acid, and mixtures thereof.

7. A process as defined in claim 1, wherein from 1 to 100% of the units of the compounds of the formula I present in the polymers as polymerized material are hydrolyzed.

8. A stable water-in-oil emulsion of a hydrolyzed polymer of an N-vinyl amide produced by the process defined in claim 1.

9. A method of using a water-in-oil emulsion of hydrolyzed poly(N-vinyl amide) obtained using a process as defined in claim 1 as a retention and flocculating agent in the manufacture of paper and for the clarification of waste water and sludges in sewers, as a dispersing agent and protective colloid for drill mud, and as a cement additive.

* * * * *